United States Patent
Ishii et al.

Patent Number: 5,103,870
Date of Patent: Apr. 14, 1992

[54] CARBON DEPOSITION PREVENTIVE DOUBLE-LAYERED TUBE FOR HANDLING CARBONACEOUS COMPOUNDS

[75] Inventors: Kunio Ishii; Naohiko Kagawa, both of Yokohama; Takahiro Iijima, Shinagawa, all of Japan

[73] Assignee: JGC Corporation, Tokyo, Japan

[21] Appl. No.: 371,460

[22] Filed: Jun. 26, 1989

[30] Foreign Application Priority Data

Jun. 28, 1988 [JP] Japan .................. 63-159732

[51] Int. Cl.⁵ .......................... H01L 35/02
[52] U.S. Cl. .................. 138/140; 138/143; 138/177; 148/909; 210/696; 428/678; 428/680; 428/681; 428/683
[58] Field of Search ........... 138/140, 143, DIG. 6, 138/116, 177, 103; 148/909; 165/134 R, 95; 210/696; 252/8.3; 428/686, 683, 678, 681; 420/583, 584.1

[56] References Cited

U.S. PATENT DOCUMENTS

| | | | |
|---|---|---|---|
| 3,718,443 | 2/1973 | Faulkner et al. | 29/196.6 |
| 4,444,731 | 4/1984 | Konoti et al. | 422/310 |
| 4,444,732 | 4/1984 | Konoki et al. | 422/310 |
| 4,505,232 | 3/1985 | Usomi et al. | 138/143 |
| 4,536,455 | 8/1985 | Maedo et al. | 138/143 |

FOREIGN PATENT DOCUMENTS

| | | |
|---|---|---|
| 0120704 | 3/1984 | European Pat. Off. |
| 3527663 | 2/1986 | Fed. Rep. of Germany |
| 1361960 | 7/1974 | United Kingdom |
| 1372232 | 10/1974 | United Kingdom |
| 1597046 | 9/1981 | United Kingdom |
| 2116209 | 9/1983 | United Kingdom |
| 2193726 | 2/1988 | United Kingdom |

*Primary Examiner*—Harvey C. Hornsby
*Assistant Examiner*—Gary K. Graham
*Attorney, Agent, or Firm*—Darby & Darby

[57] ABSTRACT

A carbon deposition preventive double-layered tube for handling carbon compounds at not less than 500° C., the double-layered tube comprising:

(a) the layer to be exposed to the carbon compounds, constructed from an alloy which is composed of Cr, Ni, and Fe in porportions shown within a triangular region I of an equilibrium diagram (FIG. 1), the region I bounded by a line from a point (A(Cr: 52% by weight, Ni: 48% by weight, Fe: 0% by weight) to a point B(Cr: 28% by weight, Ni: 36% by weight, Fe: 36% by weight), a line from the point B to a point C(Cr: 28% by weight, Ni: 72% by weight, Fe: 0% by weight), and a line from the point C to the point A; and (b) the other layer which is not exposed to the carbon compounds, constructed from an alloy which is composed of Cr, Ni, and Fe in proportions shown within a pentagonal region II of the equilibrium diagram, the region II bounded by a line from the point B to the point C, a line from the point C to a point F(Cr: 0% by weight, Ni: 100% by weight, Fe: 0% by weight), a line from the point F to a point E(Cr: 0% by weight, Ni: 90% by weight, Fe: 10% by weight), a line from the point E to a point D(Cr: 20% by weight, Ni: 30% by weight, Fe: 50% by weight), and a line from the point D to the point B.

5 Claims, 4 Drawing Sheets

CARBON DEPOSITION PREVENTIVE DOUBLE-LAYERED TUBE FOR HANDLING CARBONACEOUS COMPOUNDS

BACKGROUND OF THE INVENTION

1. Field of the Invention

The field of this invention relates to a carbon deposition preventive double-layer tube which is used for handling carbonaceous compounds such as hydrocarbons, their derivatives, carbon monoxide, or the like at temperatures higher than about 500° C.

2. Prior Art

Heretofore, tubes for handling carbonaceous compounds such as hydrocarbons, their derivatives, carbon monoxide, or the like have been generally made of steels or Ni alloys. Carbon deposition frequently occurs on protons such as heater tubes, piping, heat exchangers and the like, exposed to high temperature fluids containing carbon compounds. Carbon deposition brings about undesirable effects such as increased pressure drop, decreased heat transfer efficiency, and the like, whereby it is necessary to frequently perform decoking. Decoking is an obstacle to a steady operation, harming the economics of process and also brings about various disadvantages of the construction materials of the apparatus.

From the viewpoint of corrosion resistance, Cr is normally added to the materials of conventional tubes consisting of steels or Ni alloys. The amount of Cr added to these materials is less than 28% by weight, and heat resisting steels or alloys normally containing around 25% by weight of Cr. In the first stage of use, a protective oxide film such as $Cr_2O_3$ film stays on the surfaces of the conventional tubes. Since normal operating conditions comprise a carburizing/oxidizing atmosphere with thermal cycles, the Cr just beneath the surface of the conventional tube is gradually consumed thereby to cause deterioration of the surface. In this specification, "a carburizing/oxidizing atmosphere" means an atmosphere in which some elements are carburized and other elements are oxidized depending on the carbon and oxygen potentials of the atmosphere. "The deterioration of the surface of the tube under a carburizing/oxidizing atmosphere" in the present specification mans a phenomenon that in the case that the protective oxide film is broken, carbon penetrates and diffuses into the interior of the tube wall from the surface, reacting with the Cr in the tube material alloy to consume the Cr and form Cr carbides, whereby the Cr content of the matrix becomes poor, and the surface can readily be oxidized, so that corrosion rapidly proceeds by carburization and oxidation of the surface. In this case, the protective oxide film such as $Cr_2O_3$ is lost and oxide layers consisting essentially of Fe and Ni are formed instead. Iron oxides such as $Fe_2O_3$, nickel oxides such as NiO, or spinel oxides such a $NiFeO_4$, $FeCr_2O_4$, and the like appear on the outer surface of the tube. The iron oxides and nickel oxides are easily reduced by carbonaceous compounds into iron and nickel metals which act as a catalyst to cause carbon deposition.

An apparatus for handling carbonaceous compounds, which is made of an Fe-based, a Ni-based, a Co-based, or their mixed based alloy which contains not less than 28% by weight of Cr was provided by the present applicants. The apparatus made of a Cr-rich alloy is described in Japanese Patent Application First Publication "Kokai" 63-31535. The Cr-rich alloy containing not less than 28% by weight of Cr has a lower strength than the conventional alloys such as 25Cr-20Ni cast steel or 25Cr-35Ni cast steel at elevated temperatures. Therefore, in practice, the wall thickness of the tube must be increased, which causes a decrease in heat transfer efficiency and an increase in thermal stresses generated due to the temperature difference between the outer and inner surfaces.

Accordingly, an object of the present invention is to solve the above problems and to provide a carbon deposition preventive tube for handling carbonaceous compounds such as hydrocarbons, their derivatives, carbon monoxide, or the like at temperatures higher than about 500° C., which can also be thin walled with high strength.

SUMMARY OF THE INVENTION

In order to achieve the above object, the present invention provides a carbon deposition preventive tube having two layers: one layer exposed to the carbonaceous compounds, and comprising a Cr-rich alloy having not less than 28% by weight of Cr, and the other layer which is not exposed to the carbonaceous compounds, comprising a heat resisting alloy with high strength. Furthermore, the ranges of the chemical compositions of the two layers are controlled so that embrittlement of the boundary region between the two layers and separation of the two layers are avoided.

Accordingly, it is an object of the present invention to provide a carbon deposition preventive double-layered tube for handling carbonaceous compounds at not less than 500° C., the double-layered tube comprising:

(a) a layer to be exposed to the carbonaceous compounds, constructed from an alloy which is composed of Cr, Ni, and Fe in proportions shown within a triangular region I of an equilibrium diagram (FIG. 1), the region I bounded by a line from a point A(Cr: 52% by weight, Ni: 48% by weight, Fe: 0% by weight) to a point B(Cr: 28% by weight, Ni: 36% by weight, Fe: 36% by weight), a line from the point B to a point C(Cr: 28% by weight, Ni: 72% by weight, Fe: 0% by weight), and a line from the point C to the point A; and (b) the other layer which is not exposed to the carbonaceous compounds, constructed from an alloy which is composed of Cr, Ni, and Fe in proportions shown within a pentagonal region II of the equilibrium diagram, the region II bounded by a line from the point B to the point C, a line from the point C to a point F(Cr: 0% by weight, Ni: 100% by weight, Fe: 0% by weight), a line from the point F to a point E(Cr: 0% by weight, Ni: 90% by weight, Fe: 10% by weight), a line from the point E to a point D(Cr: 20% by weight, Ni: 30% by weight, Fe: 50% by weight), and a line from the point D to the point B.

In the present invention, the layer to be exposed to the carbonaceous compounds is constructed from a Cr-Ni-Fe alloy whose composition is in proportions as shown in the triangular region I of FIG. 1, the region I bounded by a line from the point A to the point B, a line from the point B to the point C, and a line from the point C to the point A. The line BC is determined to define a region that contains not less than 28% by weight of Cr for the layer to be exposed to the carbonaceous compounds, the layer hindering the Fe and Ni components from appearing on the surface of the tube by means of a solid and stable $Cr_2O_3$ film formed on the surface and thereby preventing carbon deposition. Therefore, the chemical compositions of the layer to be exposed to the carbonaceous compounds are controlled to contain not less than 28% by weight of Cr. The line AB is determined according to the results of a thermal cycle test mentioned below. Both the layer to be exposed to the carbonaceous compounds and the layer which is not exposed to the carbonaceous compounds should be composed of the same alloy structure, mainly of austenite phase, because the difference between the coefficient of thermal expansion of the layer to be exposed to the carbonaceous compounds and the coefficient of thermal expansion of the layer which is not exposed to the carbonaceous compounds is large at elevated temperatures; such difference enhances thermal stress; and such thermal stress may cause the two layers to be separated from each other. The Cr-Ni-Fe alloys with the chemical compositions shown in the hatched region in FIG. 1 tend to cause embrittlement at 550°-980° C. due to the precipitation of $\sigma$-phase. In order to avoid this embrittlement, the chemical compositions of the two layers and their boundary region must lie outside of the hatched region in FIG. 1. Therefore, the layer to be exposed to the carbon compounds must have Ni rich compositions as shown on the Ni rich side of the line AB in FIG. 1.

In addition, the compositions of the layer which is not exposed to the carbonaceous compounds are also set outside of the hatched region of the diagram in FIG. 1 in order to avoid embrittlement due to the precipitation of a $\sigma$-phase, and are set towards the Ni rich compositions shown on the Ni rich side of the line BD. Furthermore, the composition of the layer which is not exposed to the carbonaceous compounds is determined by the Cr rich region shown above the line DE in FIG. 1 according to the results of a "high temperature oxidation test at 1100° C. in air" of the Cr-Ni-Fe alloys.

According to the present invention, the chemical compositions of the layer to be exposed to the carbonaceous compounds and the layer which is not exposed to the carbonaceous compounds are determined in each range, respectively, so that the tube of this invention has an advantage such that the $\sigma$-phase does not precipitate in each layer and also in the boundary region between the two layers, because the points A, B and D are located on a straight line, and a line connecting an arbitrary point in the region I and another arbitrary point in the region II lies outside of the compositions shown in the hatched region in FIG. 1, wherein $\sigma$-phase precipitates.

Furthermore, it is desirable from a practical point of view that the construction material of the tube in the present invention should contain the following basic elements in its composition.

(1) Carbon: not more than 0.6% by weight

The presence of carbon is definitely beneficial for increasing mechanical strength at elevated temperatures and lowering the melting point thereby improving castability. In the case that the carbon is in excess of 0.6% by weight, the amount of the dissolved Cr in the matrix of the alloys becomes reduced, because carbon has a tendency to combine with the Cr contained in the alloys, so that it becomes difficult to form a stable $Cr_2O_3$ film.

(2) Silicon: not more than 3.0% by weight

The presence of Si definitely improves oxidation resistance in the same way as Cr. In the case that silicon content is in excess of 3.0% by weight, this causes such undesirable effects as promoting $\sigma$-phase embrittlement, and harming weldability and the like.

(3) Manganese: not more than 3.0% by weight

Manganese is an element forming austenite phase, which is stable at elevated temperatures. In this case that the manganese content is in excess of 3.0% by weight, the oxidation resistance of the surface of the tube is lessened and deterioration of the surface of the tube is readily promoted.

These three elements—Carbon, Silicon, and Manganese—are indispensable as the basic elements for normal tubes. In the present invention, additional elements which are as follows are added in order to enhance adhesion of the $Cr_2O_3$ film which prevents carbon deposition, and to maintain the strength at elevated temperatures over long periods.

(4) Niobium, Titanium, and Zirconium: each not more than 3.0% by weight

These elements readily form carbides and thus act to fix the C contained in the alloys to hinder the precipitation of chromium carbides. In other words, these elements are effective in maintaining the dissolved Cr in the matrix of the alloys of the layers at a high level, thereby improving the properties of the materials constructing the tube of the present invention. An amount of not more than 3.0% by weight of each of these elements is sufficient for fully obtaining the effects mentioned above.

(5) Tungsten, Molybdenum, and Cobalt: each not more than 3.0% by weight

These elements act to enhance the high temperature strength of the alloy by solid solution hardening. In the case that the content of any one of them is in excess of 3.0% by weight, hot workability and oxidation resistance of the alloy are spoiled.

(6) Boron: not more than 0.01% by weight

Boron contributes to enhancing the creep rupture strength. In the case that B is in excess of 0.01% by weight, weldability is impaired.

(7) Rare earth elements: not more than 1.0% by weight in total

These elements act to improve the adhesion of the $Cr_2O_3$ film on the surface, contributing to increasing resistance to deterioration due to carburization and oxidation. The presence of these elements is effective in improving hot workability of the material. In the case that the total content of the rare earth elements exceeds 1.0% by weight, the material becomes brittle and workability is adversely affected.

For the double-layered tube of the present invention, the Cr content is most important. In this connection, it is to be noted that a part of the Fe and/or Ni should be substituted for by the additive elements which are used optionally. Impurities such as P, S and the like may be contained in these alloy materials unavoidably.

The layer to be exposed to the carbonaceous compounds and the layer which is not exposed to the carbonaceous compounds of the tube according to the present invention are combined to produce a double-layered tube in manufacturing processes such as casting, forging, rolling, extrusion, drawing, powder molding, and the like. In this specification, "austenite" means that although a major part of the matrix of the alloys of the layers is composed of austenite phase, a small amount of different phases such as ferrite phase, carbides, and the like are permitted to be included.

DETAILED DESCRIPTION OF THE PREFERRED EMBODIMENTS

Figure 1:
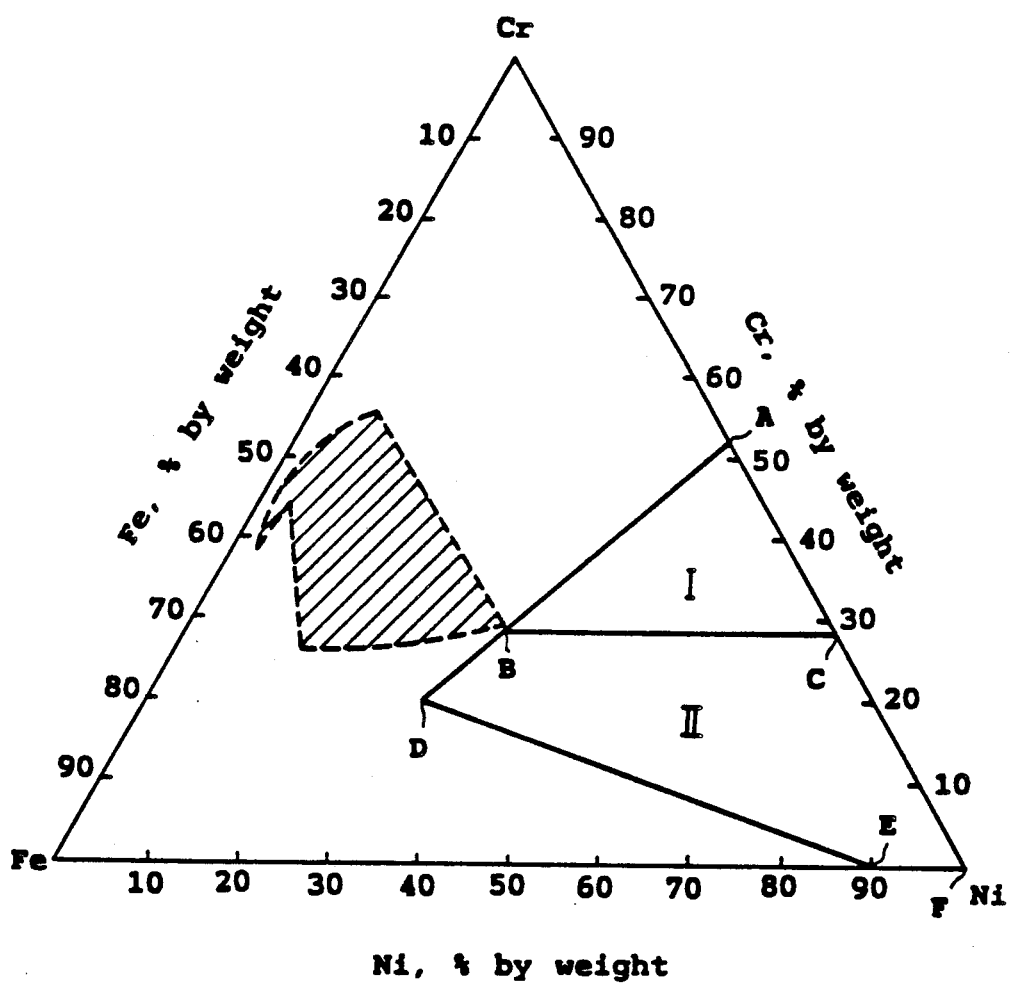
FIG. 1 is a graph showing the chemical composition ranges of a double-layered tube according to the present invention within the equilibrium diagram of the Fe-Ni-Cr alloys at 900° C.

Double-layered tubes according to the present invention were prepared for testing. Each of the manufacturing methods and the sizes of the double-layered tubes of this invention are shown in Table 1 and the chemical compositions are shown in Table 2. Each of the double-layered tubes according to Examples 1 through 3 comprises an inner layer having a chemical composition shown in the region I in FIG. 1, and an outer layer having a chemical composition shown in the region II in FIG. 1. Each of the double-layered tubes according to Examples 4 through 6 comprises an inner layer having a chemical composition shown in the region II in FIG. 1, and an outer layer having a chemical composition shown in the region I in FIG. 1. For the thermal cycle test, other tubes, from which test pieces were cut, approximately 1 m long with an outer layer of 25Cr-38Ni-0.15Fe alloy and an inner layer of Cr-Ni-Fe alloy having various chemical compositions were prepared by hot extrusion.

The double-layered tubes subjected to these tests were manufactured by hot extrusion and centrifugal casting; each method is described in detail as follows. In hot extrusion, ingots for each material were cut, forged, and machined to form billets. Each billet for the inner layer was fitted into each billet for the outer layer. The double billets thus fitted were hot-extruded by a common method. In the case of powder molding, a blended alloy powder of a predetermined composition was sintered to form each billet. In order to improve adhesion between the inner layer and the outer layer and to hinder interdiffusion of the elements of each layer at elevated temperatures, a very thin Ni layer may be provided with in advance between the inner layer and the outer layer (in this case, the outer surface of the inner layer billet is plated with Ni). The outer diameter of the tubes was determined by the aperture of the die and the inner diameter of the tubes was determined by the diameter of the mandrel. The ratio of the inner layer thickness and the outer layer thickness was generally determined in proportion to the ratio of the wall thickness of each billet. In order to obtain a tube having a smaller diameter, cold drawing was additionally used. When the forming steps were repeated, workability was maintained by annealing the tube to eliminate work hardening. In centrifugal casting, the inner layer melt was poured onto the outer layer when the inner surface of the outer layer was still in the half molten condition after the outer layer melt had been poured into the rotating metal mold. In this case, unsound regions formed unavoidably were removed by machining (not less than 1 mm of the outer surface of the tube and not less than 2.5 mm of the inner surface of the tube) to obtain the final tube size.

The examples according to the present invention and Comparative Examples were subjected to a carbon deposition test, and also a thermal cycle test to evaluate soundness of the boundary between the inner and outer layers. The test methods and the test results are shown below.

(1) Carbon deposition test together with carburizing-/oxidizing treatment

Six kinds of test materials including those from the double-layered tubes of the present invention were prepared.

Test materials:
25Cr-35Ni cast steel (HP)
25Cr-35Ni-Nb-W cast steel (HP+Nb+W)
25Cr-20Ni cast steel (HK40).

The inner layer materials of the double-layered tubes according to the present invention (Example No. 1-3).

Test pieces:
Each of the test materials was cut into plate like test pieces (2.5×10×40 mm). The surfaces of these test pieces were finished with #120 emery paper before being subjected to the test.

Test methods:
These test pieces were repeatedly subjected to caburizing/oxidizing treatment under the conditions mentioned below. The tendency of carbon deposition which follows the deterioration of the material surface was investigated in each cycle of the carburizing/oxidizing treatment. The carbon deposition was evaluated by the value obtained by dividing the weight change of the test piece due to carbon deposition by the geometrical surface area.

a. Carburizing/oxidizing treatment:
The test pieces were heated at 1100° C. in a solid carburizer (KG-30) for 1 hour and then were air-cooled. The air cooled pieces were the heated at 1100° C. in air for 1 hour and then were water-cooled.

b. Carbon deposition test:
The test pieces were maintained at 800° C. for 6 hours in a mixed gas composed of benzene and argon (benzene 15 mol %, with a feeding rate of 0.5 g/hr).

Figure 2:
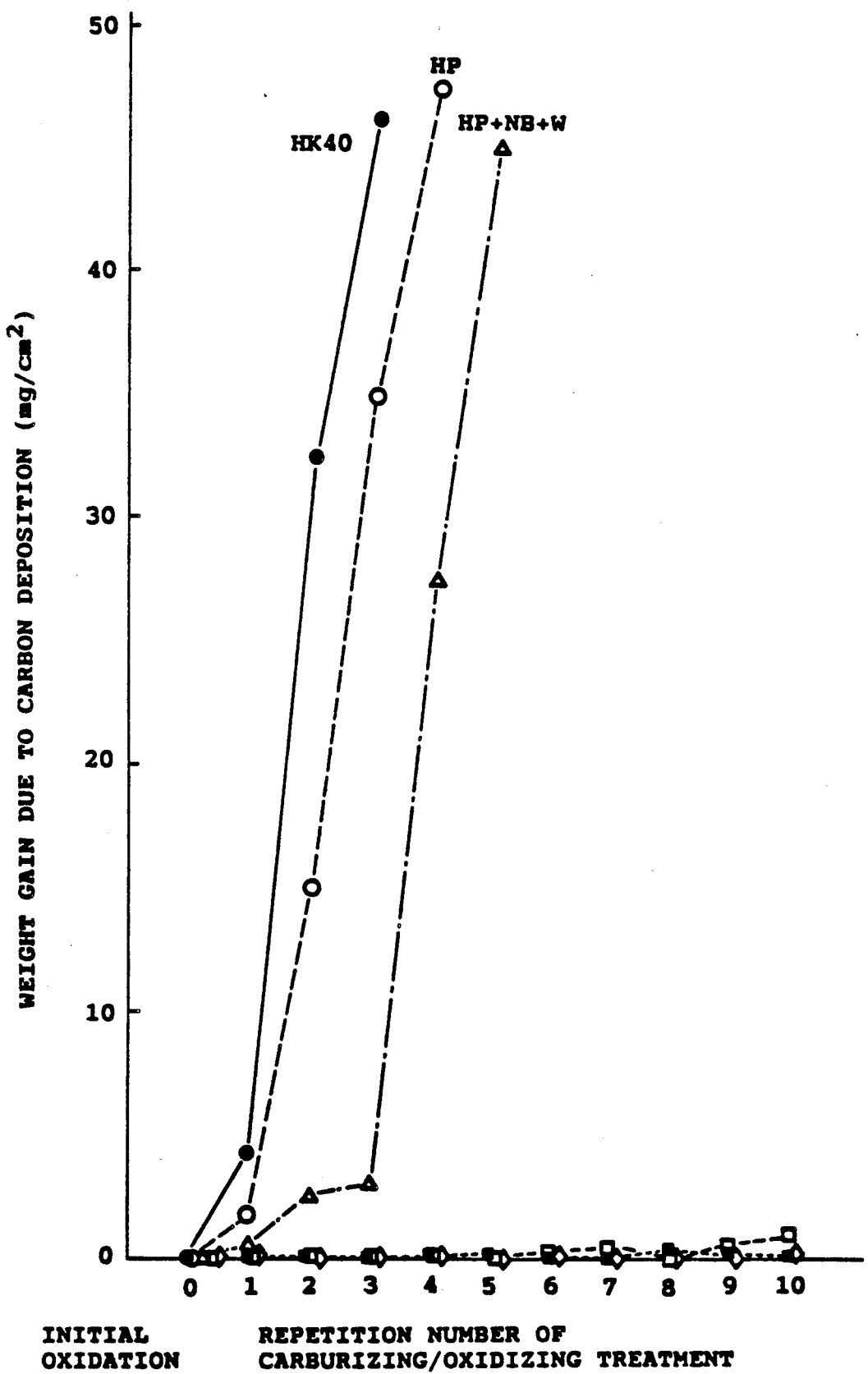
FIG. 2 is a graph showing the relationship between the numbers of repetition of carburizing/oxidizing treatment and the weight gain due to carbon deposition of the examples according to a carbon deposition test using benzene.

Test results:
The test results are shown in FIG. 2. It was determined from the above mentioned test results that the surfaces of the test pieces made of 30Cr-55-Ni-Fe alloy, 40-Cr-50-Ni-Fe alloy, and 50Cr-46Ni-Fe alloy, which were taken from the inner layer of the double-layered tubes according to the present invention, were not deteriorated when subjected to repeated carburizing/oxidizing treatment, and their capability to prevent carbon deposition was much higher than hat of the comparative examples.

FIG. 2 shows curves for inner lay alloys of double-layered tubes in accordance with the invention where the mark □ signifies 30Cr-55Ni-Fe, the mark ■ signifies 40Cr-50Ni-Fe and the mark ◊ signifies 50Cr-46Ni-1.6-Nb-Fe.

Figure 3:
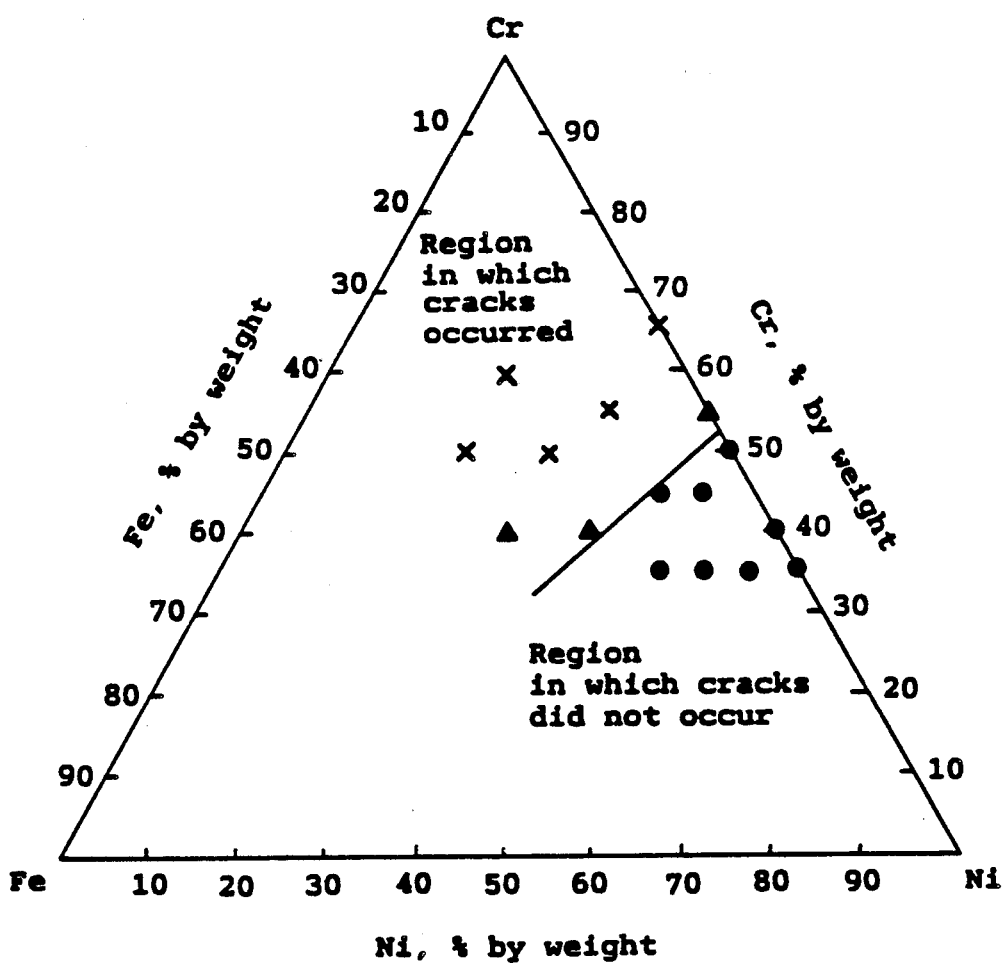
FIG. 3 is a graph showing the results of a thermal cycle test for clarifying a tendency of double-layered tubes to crack.

(2) Thermal cycle test:
Double-layered tubes made by hot extrusion comprising an outer layer made of 25Cr-38Ni-0.15Fe alloy and an inner layer made of a Cr-Ni-Fe alloy of various chemical compositions were subjected to a thermal cycle test. Each of the test pieces was prepared in a ring shape with an outer diameter of 95 mm, a thickness of 12 mm (inner layer: 3 mm, outer layer: 9 mm), and a length of 50 mm. The inner and outer surfaces and the end surfaces were finished so that the surface roughness was approximately 12.5 μm R$_{max}$ (Maximum Peak-Valley Roughness) and the ridge lines were rounded off at a radius of 1 mm. The test was conducted in 30 repetitions by heating the pieces at 1100° C. for 30 minutes and cooling them with water. The results are shown in FIG. 3. In FIG. 3, the mark ● means that the test pieces were without cracks, the mark ▲ means that the test pieces were with a few micro-cracks, and the mark × means that the test pieces were with cracks. In the case where the chemical composition of the inner layer was richer in Cr than the triangular region ABC in FIG. 1, cracks occurred mainly around the boundary between the inner and outer layers, and in some parts both of the layers were separated. When the chemical composition of the inner layer was richer in Cr than the triangular region AVC, it was presumed that the ratio of the ferrite phase in the microstructure was raised, and the coefficient of thermal expansion of the inner layer became smaller than that of the outer layer, so that the thermal stress occurring at the boundary was enhanced to cause cracks.

(3) High temperature oxidation test in air

Figure 4:
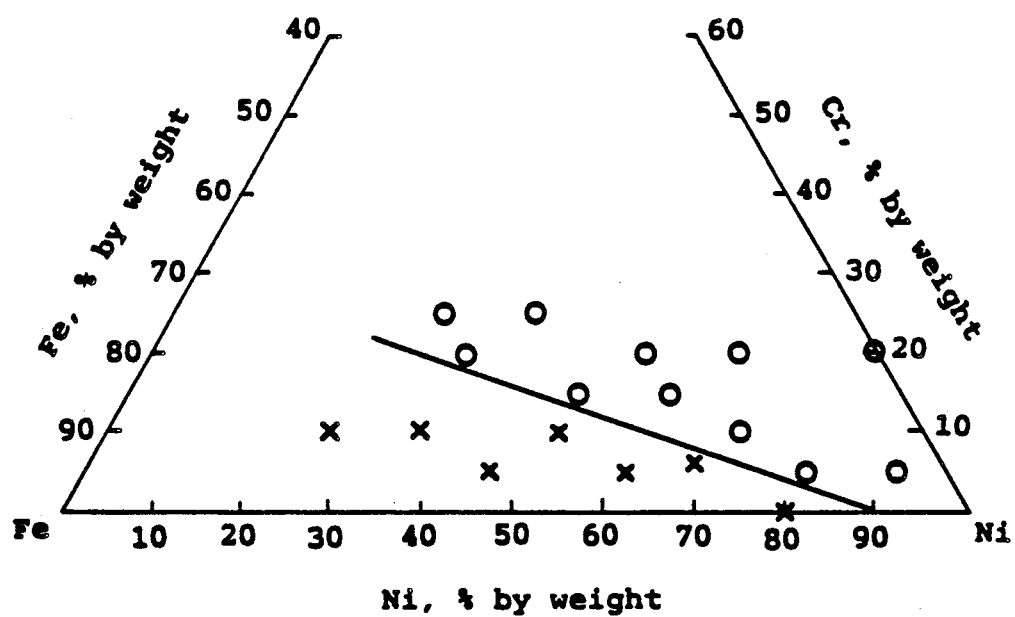
FIG. 4 is a graph showing the results of an oxidation test of Fe-Ni-Cr alloys at 1100° C. in air.

Each of the various Fe-Cr-Ni alloys were vacuum-melted by high frequency induction heating to produce an approximately 30 gram button shape ingots. The ingots were formed into disks having approximately 8 mm thickness by pressing at 1100° C. and then were homogenized by heating at 1100° C. for 24 hours. The test pieces were then cut from the disks and the whole surfaces were finished by #600 emery paper. The test pieces were heated at 1100° C. for 100 hours and metal wastage due to oxidation was measured for each piece. The results are shown in FIG. 4. The metal wastage due to oxidation was extremely large for the test pieces with chemical compositions poorer in Cr below the boundary line DE in FIG. 1 and the metal wastage due to oxidation was slight for the test pieces with chemical compositions richer in Cr above the boundary line DE in FIG. 1.

In FIG. 4, the mark O signifies slight oxidation of <1 mm/year and the mark X signifies heavy oxidation of ≧1 mm/year.

TABLE 1

| Double-layered Tube | Manufacturing Method of the Tube | Size |
|---|---|---|
| Example 1 | hot extrusion/solution heat treatment | outer diameter: 95 mm/thickness: 13 mm/length: 7.5 m<br>inner layer (Cr rich alloy): 3.2 mm<br>outer layer: 9.8 mm |
| Example 2 | hot extrusion/cold drawing/<br>solution heat treatment | outer diameter: 85 mm/thickness: 8 mm/length: 10.0 m<br>inner layer (Cr rich alloy): 2.5 mm<br>outer layer: 5.5 mm |
| Example 3 | centrifugal casting<br>(inner and outer surfaces machined) | outer diameter: 102 mm/thickness: 10 mm/length 3.5 m<br>inner layer (Cr rich alloy): 1.5-3.5 mm<br>outer layer: 8.5-6.5 mm |
| Example 4 | powder molding/hot extrusion/<br>solution heat treatment | outer diameter: 95 mm/thickness: 13 mm/length: 10.5 m<br>inner layer: 10.2 mm<br>outer layer (Cr rich alloy): 2.8 mm |
| Example 5 | powder molding/hot extrusion/<br>cold drawing/solution heat treatment | outer diameter: 85 mm/thickness: 8 mm/length: 10.5 m<br>inner layer: 6.3 mm<br>outer layer (Cr rich alloy): 1.7 mm |
| Example 6 | centrifugal casting<br>(inner and outer surfaces machined) | outer diameter: 102 mm/thickness: 10 mm/length: 3.0 m<br>inner layer: 6.5-8.0 mm<br>outer layer (Cr rich alloy): 3.5-2.0 mm |

Temperature Conditions: hot extrusion: 1150° C.; solution heat treatment: 1200° C.; powder molding: 1050° C.; centrifugal casting: 1400-1500° C. (pouring temperature)

TABLE 2

| Double-layered Tube | Chemical Composition (% by weight) | | | | | | | | | | | | | |
|---|---|---|---|---|---|---|---|---|---|---|---|---|---|---|
| | Cr | Ni | Fe | C | Si | Mn | Nb | Ti | Zr | W | Mo | Co | B | Misch Metal |
| Example 1: | | | | | | | | | | | | | | |
| inner layer (region I) | 30.33 | 55.25 | bal. | 0.017 | 0.15 | 1.02 | — | — | — | — | — | — | — | Addition 0.05 |
| outer layer (regoin II) | 25.32 | 38.14 | bal. | 0.16 | 1.73 | 0.99 | 0.83 | 0.04 | 0.003 | — | 1.52 | — | 0.004 | — |
| Example 2: | | | | | | | | | | | | | | |
| inner layer (region I) | 40.21 | 50.07 | bal. | 0.023 | 0.19 | 0.97 | — | — | — | — | — | — | — | — |
| outer layer (regoin II) | 24.97 | 37.86 | bal. | 0.15 | 1.64 | 1.05 | — | 0.05 | — | 1.01 | 1.18 | — | 0.005 | — |
| Example 3: | | | | | | | | | | | | | | |
| inner layer (region I) | 50.43 | bal. | 1.03 | 0.061 | 0.82 | 0.03 | 1.59 | — | — | — | — | — | — | — |
| outer layer (regoin II) | 27.21 | 48.59 | bal. | 0.24 | 1.51 | 0.97 | — | — | — | 2.18 | — | 2.30 | — | — |
| Example 4: | | | | | | | | | | | | | | |
| inner layer (region I) | 26.27 | 41.52 | bal. | 0.18 | 1.65 | 1.04 | — | 0.06 | 0.004 | — | 1.24 | — | 0.003 | — |
| outer layer (regoin I) | 35.28 | 54.70 | bal. | 0.027 | 0.29 | 1.15 | — | 0.05 | — | — | — | — | — | Addition 0.05 |
| Example 5: | | | | | | | | | | | | | | |
| inner layer (region II) | 24.97 | 37.88 | bal. | 0.19 | 1.81 | 1.14 | 0.97 | 1.52 | — | — | — | — | 0.005 | Addition 0.08 |
| outer layer (regoin I) | 41.33 | 49.96 | bal. | 0.018 | 0.23 | 0.18 | — | — | — | — | — | — | — | — |
| Example 6: | | | | | | | | | | | | | | |
| inner layer (region II) | 23.59 | 44.31 | bal. | 0.21 | 0.83 | 1.31 | — | — | 0.21 | 0.89 | 1.03 | — | — | — |
| outer layer (regoin I) | 51.93 | bal. | 1.57 | 0.17 | 0.98 | 0.14 | 1.63 | — | — | — | — | — | — | — |
| Comparative Examples: | | | | | | | | | | | | | | |
| HP | 25.23 | 35.41 | bal. | 0.51 | 1.36 | 1.37 | — | — | — | — | 0.21 | — | — | — |
| HP + Nb + W | 25.38 | 21.04 | bal. | 0.42 | 1.42 | 1.23 | — | — | — | — | 0.15 | — | — | — |

TABLE 2-continued

| Double-layered Tube | Chemical Composition (% by weight) | | | | | | | | | | | | | |
|---|---|---|---|---|---|---|---|---|---|---|---|---|---|---|
| | Cr | Ni | Fe | C | Si | Mn | Nb | Ti | Zr | W | Mo | Co | B | Misch Metal |
| HK40 | 26.11 | 36.57 | bal. | 0.48 | 1.52 | 1.40 | 1.53 | — | — | 1.07 | 0.33 | — | — | — |

What is claimed is:

1. A carbon deposition preventive double-layered tube for handling carbonaceous compounds which decompose to deposit carbon at not less than 500° C., the double-layered tube comprising:

means for preventing carbon deposition from arising on a surface of the layer of the tube that is to be exposed to the carbon compounds and for providing precipitation that causes embrittlement from arising which would otherwise take place because of mutual diffusion between the layers of the double-layered tube, said preventing and avoiding means including (a) the layer to be exposed to the carbon compounds being constructed from an alloy which is composed of Cr, Ni, and Fe in proportions only within a triangular region identified as region I of FIG. 1 to have as a first vertex a point corresponding to a composition of Cr: 52% by weight, Ni: 48% by weight, Fe: 0% by weight, having as a second vertex a point corresponding to a composition of Cr: 28% by weight, Ni: 36% by weight, Fe: 36% by weight, and having as a third vertex a point corresponding to a composition of Cr: 28% by weight, Ni: 72% by weight, Fe: 0% by weight; and (b) the other layer which is to be free of exposure to the carbonaceous compounds being constructed from an alloy which is composed of Cr, Ni, and Fe in proportions only within a pentagonal region identified as region II of FIG. 1 to have as a first vertex the point corresponding to the composition of Cr: 28% by weight, Ni: 36% by weight, Fe: 36% by weight, having as a second vertex the point corresponding to the composition of Cr: 28% by weight, Ni: 72% by weight, Fe: 0% by weight, having as a third vertex a point corresponding to the composition of Cr: 0% by weight, Ni: 100% by weight, Fe: 0% by weight, having as a fourth vertex a point corresponding to a composition of Cr: 0% by weight, Ni: 90% by weight, Fe: 10% by weight, and having as a fifth vertex a point corresponding to a composite of Cr: 20% by weight, Ni: 30% by weight, Fe: 50% by weight.

2. A carbon deposition preventive double-layered tube for handling carbon compounds according to claim 1, wherein a part of Fe and/or Ni are optionally substituted for by at least one component of not more than 0.6% by weight of C, not more than 3.0% by weight of Si, and not more than 3.0% by weight of Mn.

3. A carbon deposition preventive double-layered tube for handling carbon compounds according to claims 1 or 2, wherein a part of Fe and/or Ni are optionally substituted for by at least one component of not more than 3.0% by weight of Nb, not more than 3.0% by weight of Ti, not more than 3.0% by weight of Zr, not more than 3.0% by weight of W, not more than 3.0% by weight of Mo, not more than 3.0% by weight of Co, not more than 0.01% by weight of B, and not more than 1.0% by weight of rare earth metals in total.

4. A carbon deposition preventive double-layered tube for handling carbon compounds according to claim 1, wherein the layer to be exposed to the carbon compounds is an inner layer and the other layer which is not exposed to the carbon compounds is an outer layer.

5. A carbon deposition preventive double-layered tube for handling carbon compounds according to claim 1, wherein the layer to be exposed to the carbon compounds is an outer layer and the other layer which is not exposed to the carbon compounds is an inner layer.

* * * * *